United States Patent Office 2,784,452
Patented Mar. 12, 1957

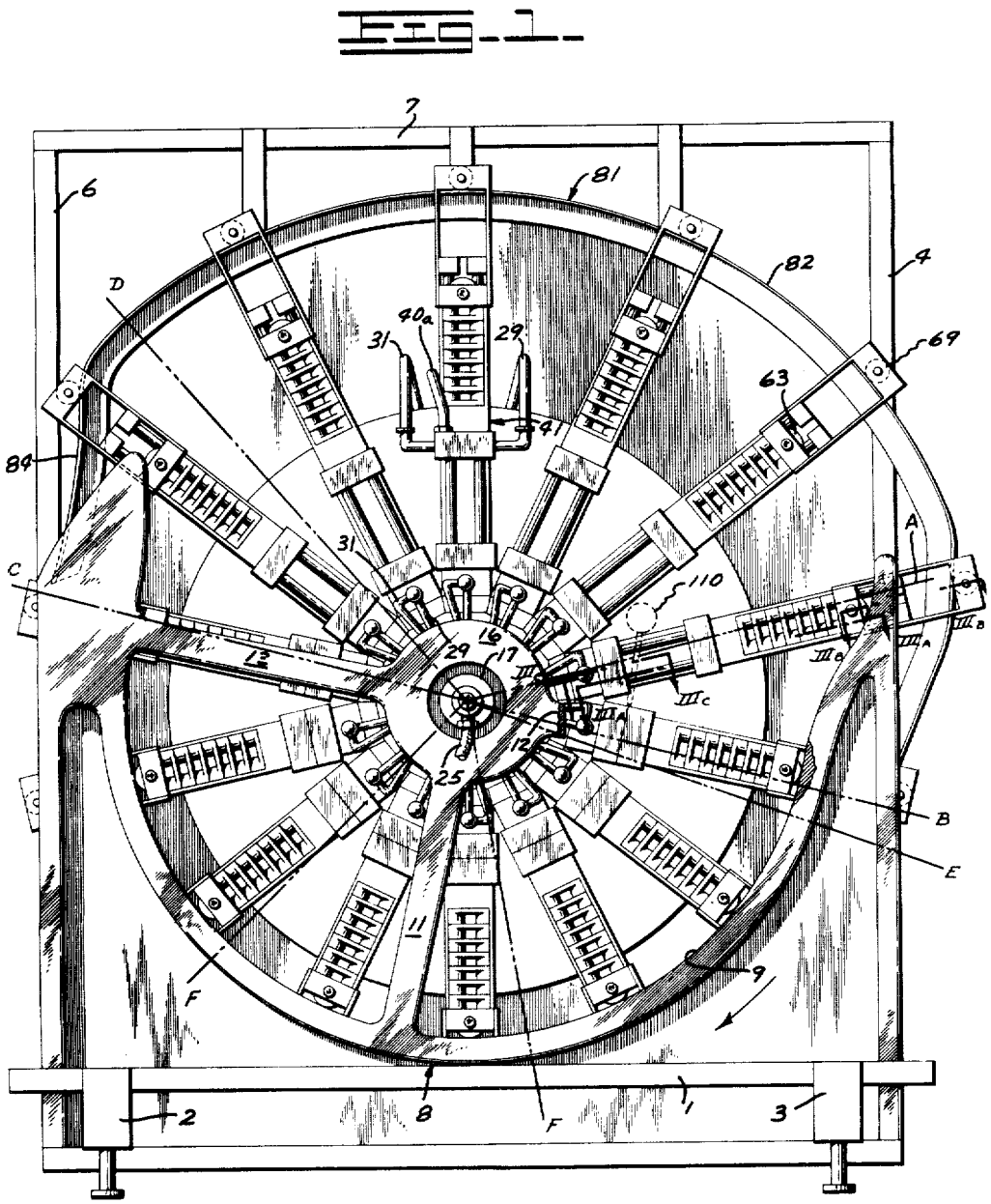

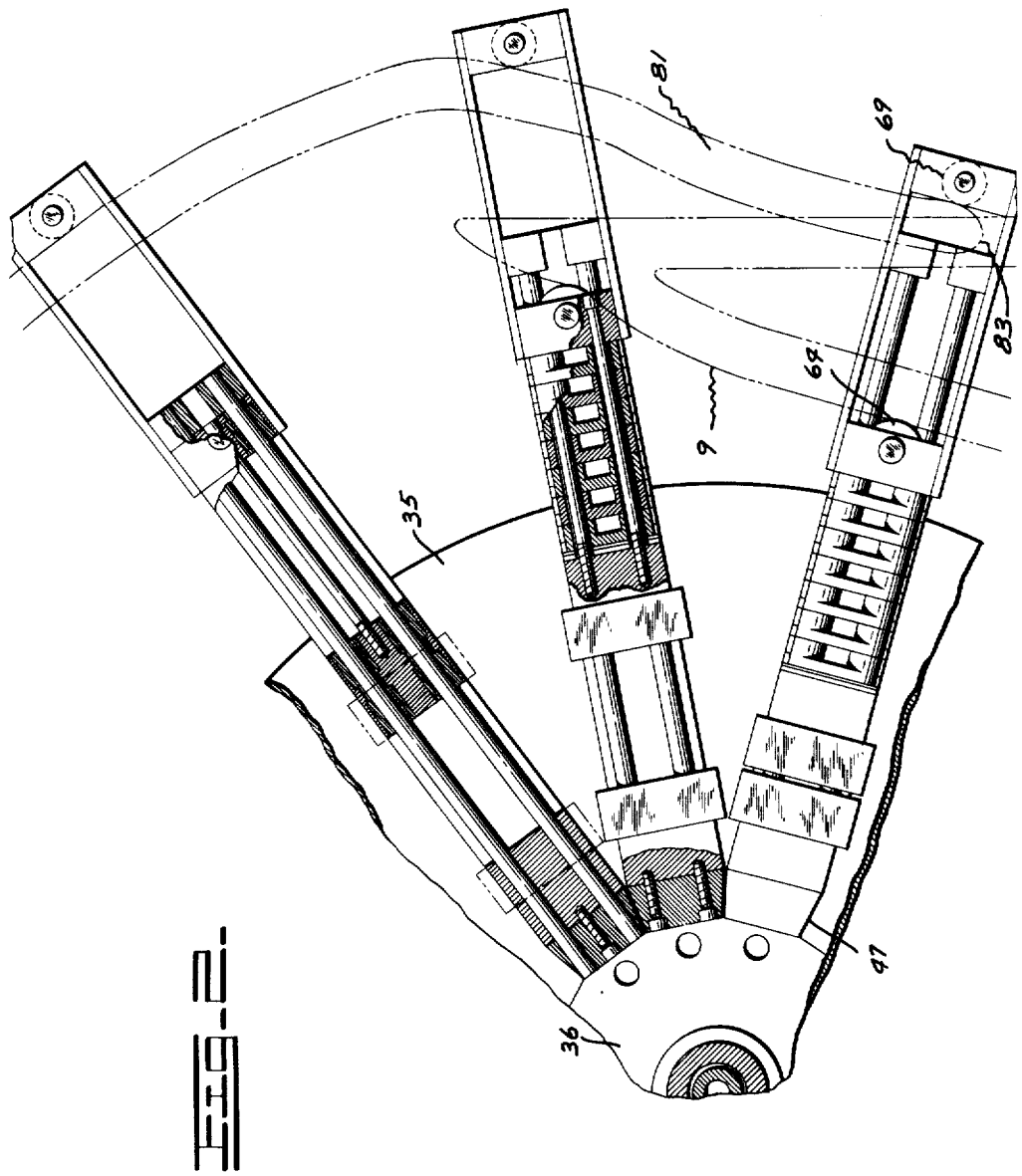

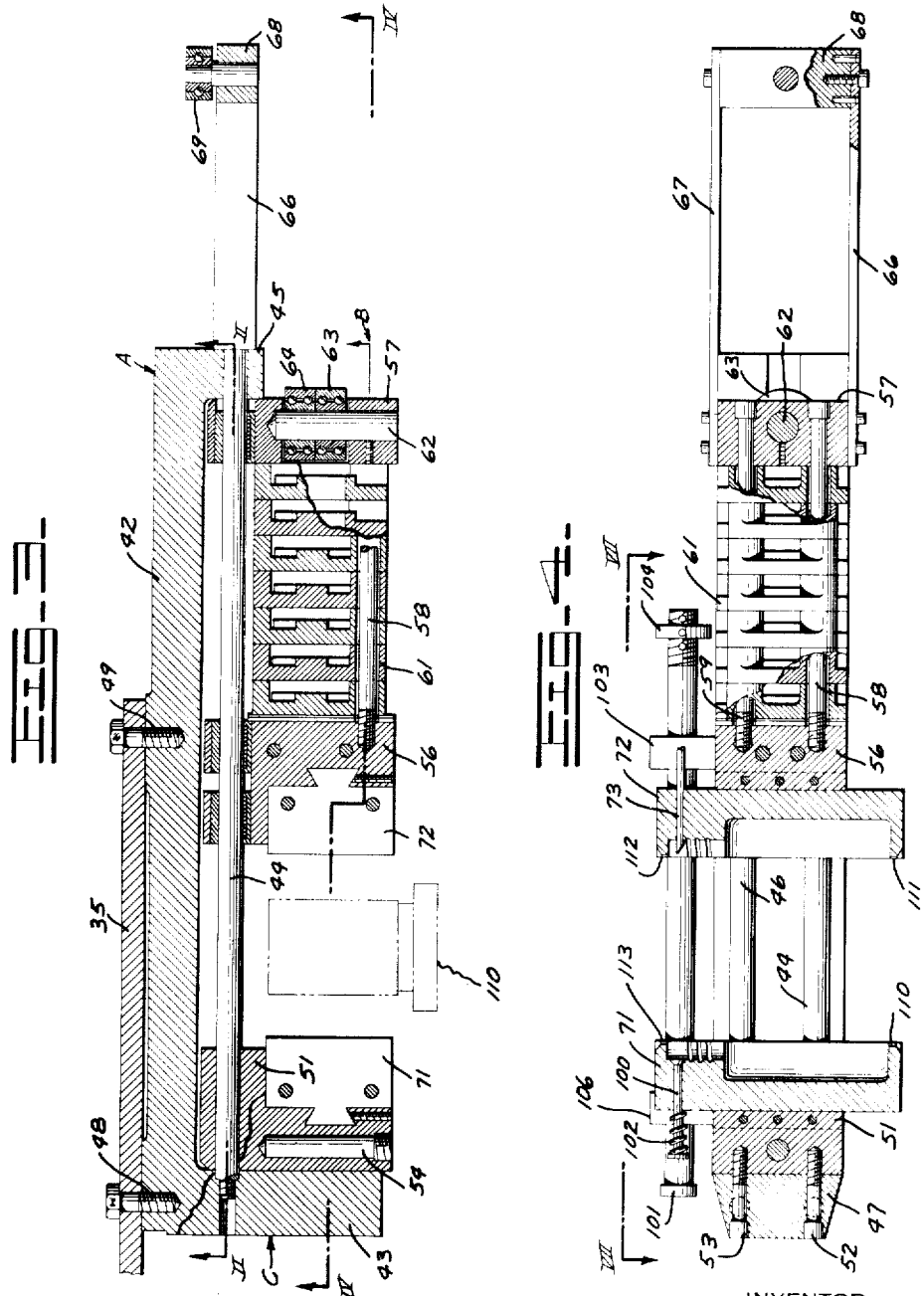

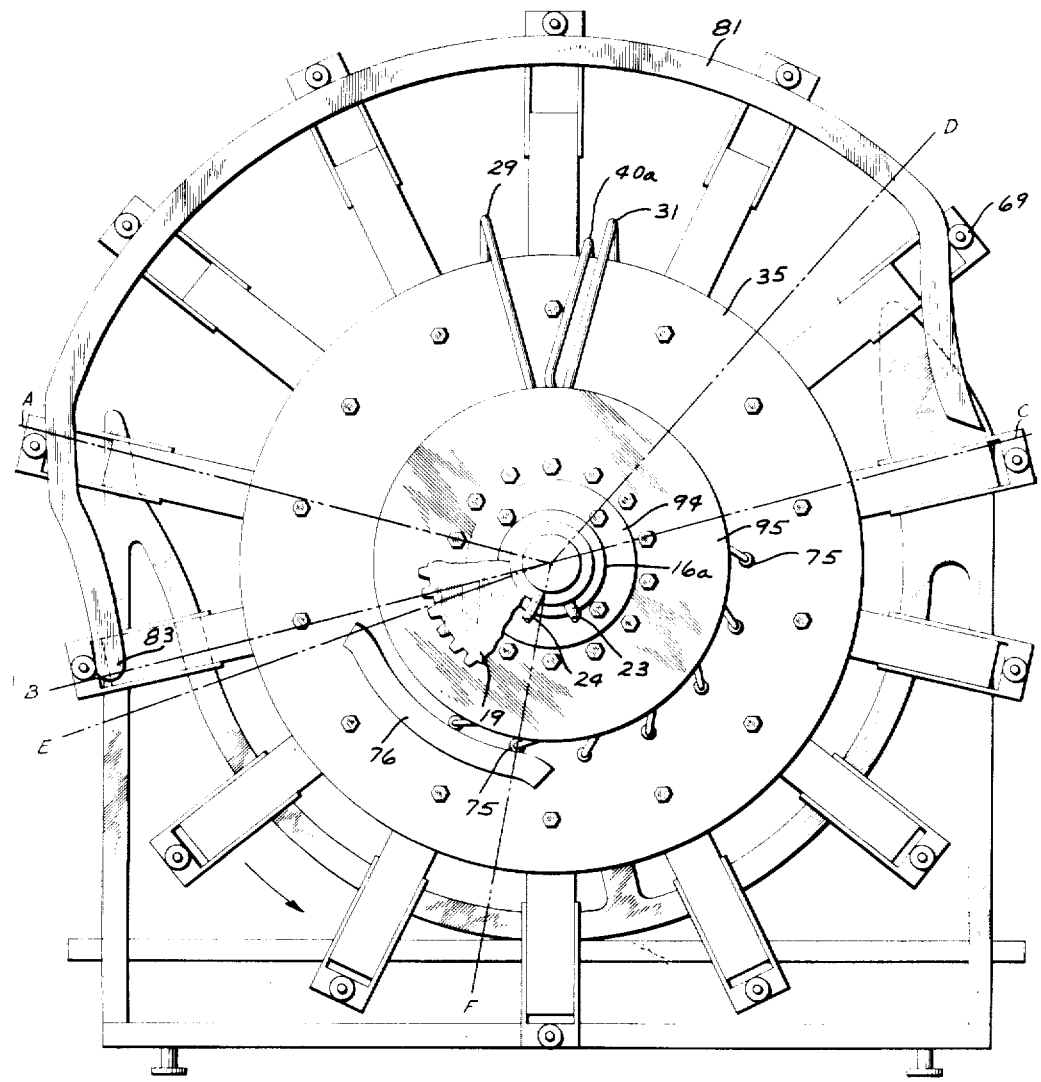

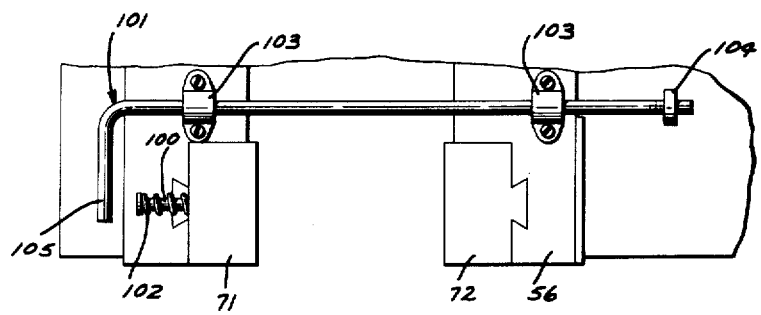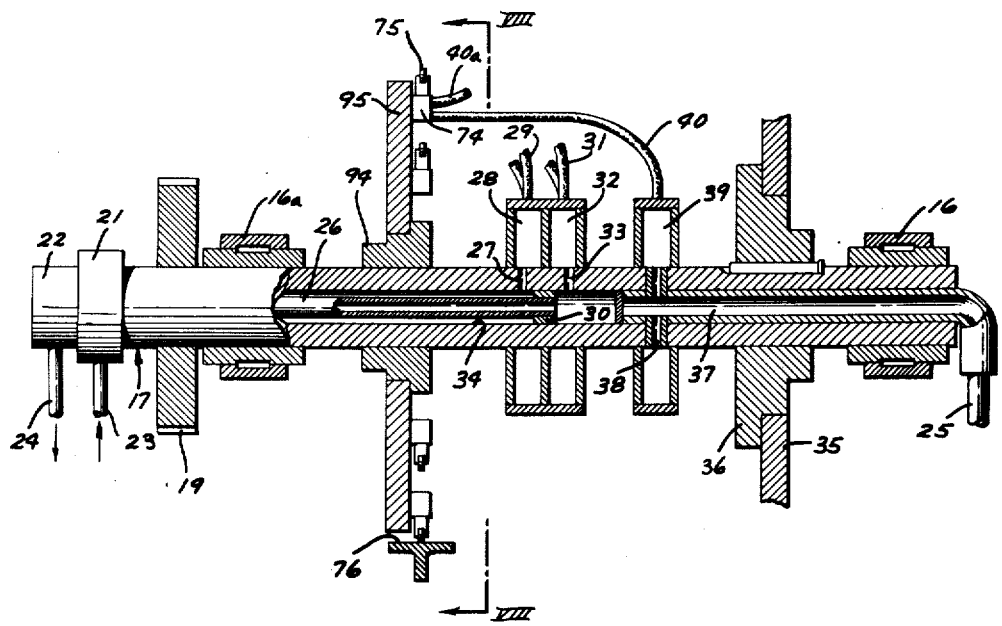

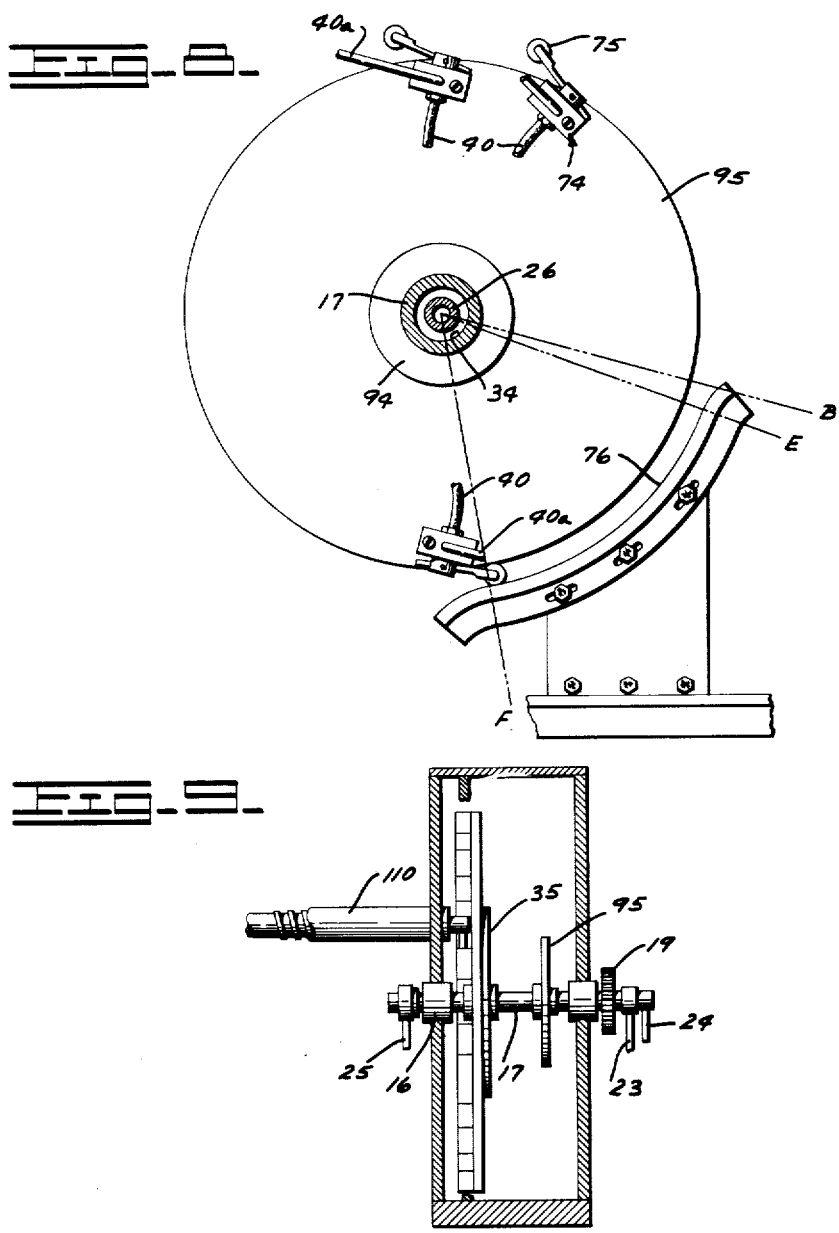

2,784,452

VERTICAL MACHINE WITH RADIALLY MOVING MOLDS FOR FORMING HOLLOW ARTICLES

Herbert S. Ruekberg, Highland Park, and John L. Szajna, Norridge, Ill., assignors, by mesne assignments, to Continental Can Company, Inc., New York, N. Y., a corporation of New York Application December 17, 1951, Serial No. 262,064

2 Claims. (Cl. 18—5)

This invention refers to a device for automatically molding hollow articles from a continuously moving softened tube of synthetic organic plastic material, and particularly to a type thereof wherein the molds travel continuously and circularly in a vertical plane and move relatively toward and away from each other in their closing and opening operations in a direction radial with respect to their circle of travel.

In the art of making bottles, or other hollow articles, from synthetic organic plastic material, there has been proposed a wide variety of machines utilizing extruded material in a variety of different ways. These machines have, on the whole, been relatively complicated and many of them have found it necessary to incorporate the plastic extrusion equipment as an integral part of the machine and provide for its close cooperation, and often physical contact, with a succession of molds.

In the copending application, Serial No. 171,340, now U. S. Patent 2,579,390, there is disclosed and claimed a machine for cooperating with a conventional extruder and receiving extruded tubular material from it continuously and forming same into hollow articles which require only a minor amount of other operations to become finished articles. However, in the machine of said application, while it is effective and performs a useful and valuable function, there is required a number of relatively complex parts and the problem of guiding the plastic tubing into the molds is necessarily handled by a number of individually adjustable guide bars, as therein illustrated and explained in detail.

It, accordingly, has become desirable to provide a machine capable of performing the same functions but which machine would be materially less complex and would be somewhat easier to adjust.

Accordingly, a principal object of the present invention has been to provide a machine carrying a plurality of molds through a circular path, which path lies in a vertical plane, and so opening and closing said molds as to enable same to cooperate with a downwardly moving tube of softened synthetic organic plastic material for the purpose of forming a succession of hollow articles.

A further object of the invention is to provide a machine, as aforesaid, wherein the soft, extruded tubing will fall readily and naturally into place in the moving molds and will require a minimum of positive guiding.

A further object of the invention has been to provide such a machine operating upon such mechanical principles as to make possible its construction with a minimum of operating parts.

A further object of the invention has been to provide a machine, as aforesaid, requiring a minimum of actual adjustment.

A further object of the invention has been to provide a machine, as aforesaid, wherein one set of mold halves are stationary and only the other set of mold halves are movable.

A further object of the invention has been to provide a machine, as aforesaid, wherein the movable mold halves are moved directly and mechanically by relatively simple parts.

A further object of the invention has been to provide a machine, as aforesaid, wherein all moving parts are readily accessible from the outside of the assembled machine for repair, adjustment or replacement.

A further object of the invention is to provide a machine, as aforesaid, wherein the parts are readily adjustable to receive molds of varying sizes without the necessity of changing any of the major working parts of the machine.

Other objects and purposes of the invention will be apparent to persons acquainted with apparatus of this general sort upon reading of the following specification and study of the accompanying drawings.

In the drawings:

Figure 1 is a partially schematic, partially broken, front elevation view of apparatus embodying my invention.

Figure 2 is an enlarged view of a segment of the mold carrying part of the apparatus, the sectional portion in the middle arm thereof being taken in the same plane as line IV—IV in Figure 3 and the sectional portion in the upper arm thereof being taken on line II—II of Figure 3.

Figure 3 is a composite of three sections, the major section being taken on the line IIIa—IIIa of Figure 1, the minor parts B and C being taken, respectively, on lines IIIb—IIIb and IIIc—IIIc of Figure 1.

Figure 4 is a view of an arm partly in elevation and partly in section, the sectional portions being taken on several lines IV—IV in Figure 3 and the parts in elevation being intermediate said lines IV—IV.

Figure 5 is a central section taken through the hub structure of the machine showing the front of the machine at the right of the drawing.

Figure 6 is a partially schematic, fragmentary rear elevational view of the apparatus showing the end opposite to that shown in Figure 1.

Figure 7 is an elevation of the molds and part of the mechanism associated therewith and showing one preferred form of knock-out mechanism.

Figure 8 is a section taken on the line VIII—VIII of Figure 5 and showing the valve and valve control mechanism for controlling pressure fluid.

Figure 9 is a somewhat schematic view of the machine of the invention together with an extruder for illustrating their operational relationship.

*General description*

In general, our improved machine comprises a hub supported for rotation, preferably on a horizontal axis, in any convenient manner and driven by any convenient means. Mounted on said hub is a plurality of radially poistioned arms. Each of said arms supports a pair of mold halves, positioned radially with respect to each other and of which the inner thereof does not move with respect to said arm and the outer thereof is mounted for radial reciprocation. Suitable cam mechanism is provided to move each respective outer mold half toward and away from its mating inner mold half upon rotation of said hub and the several arms carried thereby. An extrusion machine of standard construction is utilized for supplying tubular plastic material continuously to said molds as same revolve about said shaft. Each set of molds closes about said tube and isolates a segment thereof. As any given pair of mold halves close, a hollow needle carried on one of said mold halves pierces the side of said tube and enters into the interior of the segment isolated by said pair of mold halves. Fluid under pressure is introduced into said isolated segment through said hollow needle and the plastic material is blown outwardly against the walls of the mold. The pressure is held thereon until the plastic material has set at which time the pressure is released. The molds are thereafter successively opened and the segments are removed. Each segment has assumed the shape of the mold and may, by simple operations, be finished in any desired manner.

*Detailed description*

In the following description, it will be assume that the machine is intended for making bottles, for the specific embodiment here illustrated was designed primarily for that purpose. However, it will be understood that this reference to bottles is illustrative only and the apparatus hereinafter disclosed is fully capable of making a wide variety of other hollow articles.

With reference to the drawings, it will sometimes be found convenient to utilize the words "upper" and "lower" or "right" and "left," or any of the several derivatives thereof. This, unless otherwise clearly appearing by the context, will refer to the directions with reference to Figure 1 of the drawing of such other figure to which reference may be made.

Referring first to Figure 1 there is shown a base member 1 having leg means 2 and 3 by which same is conveniently supported upon a floor and from which vertical frame members 4 and 6 extend upwardly. These latter may conviently be connected across their respective tops by a top frame member 7.

Supported upon said base and between said side members is a shaft supporting frame 8 which includes the hereinafter mentioned mold closing cam surface 9 and the shaft supporting arms 11, 12 and 13, and a bearing support 16. Said bearing support has a suitable internal opening therein for the support of conventional bearings and a suitable shaft 17.

Said shaft is rotated at a constant rate in a convenient manner by a motor and gear box assembly (not shown) driving the gear 19 (Figure 5).

Said shaft 17 is hollow and is provided with conventional housings 21 and 22 for the admission and exit of temperature control fluid, as cooling water, through the conduits 23 and 24, respectively. The conduit 26 extends through the shaft co-axially therewith and past the partition 30. Fluid from the conduit 24 may then pass through the conduit 26 and through the opening 33 into the chamber 32 from whence it may be carried through suitable flexible conduits 31 into one side of the several molds, both movable and immovable, as hereinafter described in more detail. Return fluid may come through the conduits 29 into the chamber 28, through the passageway 27 and into the annular space 34 between the walls of the hollow shaft 17 and the conduit 26. Both of said chambers 28 and 32 are defined by housings which are mounted on the rotatable shaft 17 and rotate with both said shaft and plate 35. Said fluid will thence pass out by the housing 22 into the conduit 24. While the conduit 23 has been assumed as the inlet conduit and the conduit 24 has been assumed as the outlet conduit, it will be apparent that this is a matter of choice and these functions may be reversed. A hub 36 is affixed in any convenient manner to the shaft 17 intermediate the ends thereof and in non-rotatable relationship therewith. The mold supporting plate 35 is mounted on a suitably shaped step within said hub plate 36.

A further hub 94 is affixed to said shaft and carries a plate 95 upon which are mounted the several valves 74. A valve cam track 76 is mounted on the frame of the machine in any convenient manner to cooperate with the rollers 75 of the several actuators for said valves.

Pressure fluid for blowing the plastic article against the sides of the mold, as hereinafter set forth in more detail, is admitted from the conduit 25 through the conduit 37, passes through the pipe 38 into the drum 39, which drum is mounted on the rotatable shaft 17 and rotates both with said shaft and with the plate 95. Said pressure fluid is then conducted by the conduits 40 to the several valves 74 and thence to the molds in the manner hereinafter set forth in detail.

Mounted on the plate 35 and radially with respect to the hub are a plurality of arms 41 of which one thereof is shown in detail in Figures 3 and 4. Referring first to Figure 3, there is shown an arm base 42 having an inner arm end 43 and an outer arm end 45. A pair of rods 44 and 46 extend between said arm ends. Said arm ends are preferably tapered, as at 47 in order to permit them to fit together against said hub as best shown in Figure 2. Threaded bolt openings 48 and 49 are provided in the arm base for receiving bolts thereinto by which said arm bases are respectively attached to said back plate 35.

Mounted at the radially inner end of the rods 44 and 46 is the inner mold holding block 51 which is held snugly against the inner arm end 43 by the cap bolts 52 and 53 (Figure 4). Suitable means, indicated at 54 are provided for admitting temperature control liquid into the mold holding blocks from which the molds are cooled by contact, or the molds may be cored and cooling fluid from said mold holding blocks, or other convenient source, be led therethrough.

Mounted slidably on said rods 44 and 46 is an outer mold holding block 56. Spaced from said outer mold holding block 56 is an actuator supporting block 57 which is likewise mounted slidably upon said rods 44 and 46. Tie bolts 58 and 59 extend from said actuator block 57 to the outer mold supporting block 56 and hold them tightly against the several spacer blocks 61 interposed therebetween. In the drawing, these spacer blocks are all shown in association with the radially outer mold half. However, they, or some of them, can also be used in association with the inner mold half if and when desired. By varying the number of spacer blocks used with the inner and the outer molds, respectively, the radius of the circle defined by the molds when in closed position may be varied as desired in order to accommodate the machine for different lengths of molds. Further, by selecting the proper number of said spacer blocks, the mold supporting blocks 51 and 56 can be placed at a selected distance apart when in normally opened position in order to accommodate the machine to molds of different radial thicknesses without the necessity of changing the position of the cams hereinafter described.

A pivot pin 62 extends through the actuator block 57 and pivotally supports the mold closing rollers 63 and 64 thereon for purposes appearing hereinafter.

A pair of straps 66 and 67 are fixed in any convenient manner, as by bolts, to each side of the actuator block 57, as best shown in Figure 4, and extend in the same direction as, and beyond, the slide rods 44 and 46. These support a roller block 68 at their outer ends which roller block supports a suitable mold opening roller 69.

The mold supporting blocks 51 and 56 support suitable mold halves 71 and 72, respectively, which may define any desired internal cavity. In the mold halves shown in Figure 4, the cavity is designed to form a bottle. Said mold half 72 has a hollow needle 73 fixedly mounted thereon and extending into said cavity for piercing and entering the plastic tube in the manner hereinafter to be described.

Turning now to Figure 2 there are shown three of said arms in their assembled relation with respect to each other and with respect to the hub 36 of the machine. The mold closing cam surface 9 is arranged as best shown in Figures 1 and 2 for bearing against the mold closing rollers 63 and 64 and thereby urging the actuating block 57 radially inwardly, and through the apparatus connected thereto urging the movable mold 72 radially inwardly toward the fixed mold 71. With the apparatus rotating in a clockwise direction, as indicated by the arrow in Figure 1 the mold closing cam surface 9 will engage said mold closing rollers 63 and 64 and start the closing of said molds at a point approximately 75 degrees clockwise from the vertical as indicated by line A in Figure 1. The molds are fully closed at and beyond line B which is approximately 105 degrees clockwise from the vertical. Said cam surface 9 will then hold said molds closed to the point indicated by the line C in Figure 1 which is positioned approximately 285 degrees clockwise from the vertical and the molds will be released and opened, which opening will be completed at D which is about 315 degrees clockwise from said point of beginning.

A mold opening cam track 81 is suitably supported upon the frame of the machine and has a cam surface 82 for positioning and guiding the mold opening roller 69 of the several arms.

As best shown in Figure 1, the mold opening cam surface 82 turns inwardly between lines A and B at an angle corresponding to the angle of the mold closing cam surface 9. Thus, as the cam surface 9 moves the mold closing rollers 63 and 64 radially inwardly, the cam surface 82 permits the mold opening roller 69 to follow. The cam surface 82 terminates at the point 83 which is located in or near the line B. The other end of the cam surface 82 is indicated at 84 in Figure 1 and is located in or near line C. It turns outwardly corresponding to the outward turning of the cam surface 9. The roller 69 is thus urged outwardly by the mold opening cam surface 82 and pulls the movable mold half radially outwardly away from the stationary mold half as soon as such movement is permitted by the curve of the mold closing cam surface 9.

Said hollow needle 73 is supplied with pressure fluid, as air, by a conduit 40a from a valve 74 which in turn is supplied by the conduit 40 leading from the housing 39 surrounding the shaft. Each of the several valves 74 is controlled by its respective roller 75 operating on the valve cam track 76, as best shown in Figure 6. The end of cam track 76 acting to open the respective valves 74 is located approximately at line E in Figure 1, that is at about 110 degrees to 115 degrees clockwise from the vertical in this specific embodiment, and the end of the cam track 76 permitting the respective valves 74 to close is located approximately in line F in Figure 1, that is, about 170 degrees clockwise from the vertical in this specific embodiment.

Each of the other mold halves are similarly constructed, equipped with a needle, controlled and supplied with pressure fluid. Each of these specifically mentioned locations for said lines A, B, C, D, E and F are correct for the specific embodiment of the invention herein utilized for illustrative purposes, but these are illustrative only and will vary with machines of different sizes and intended for different uses. Accordingly, these statements of position should be taken as illustrative only and not as limiting.

It will be observed that each of the mold halves are mounted on a surface of said arm which is parallel to the plane of movement of said arm. This not only enables the molds to be supplied with extruded tubing from the front of the machine, but also places all of said working parts, and particularly the molds, in a position which are easily accessible from the front of the machine bearing all parts of the operating cycle. This greatly facilitates not only assembly but also operation and maintenance.

A preferred form of knock out mechanism is shown in Figures 4 and 7 but it will be understood that this is shown by way of illustration only and other forms of knock out mechanism, which may be varied freely to fit the type of article being molded, may be provided. In this particular device there is shown a knock out pin 100 extending through the mold 71 into the cavity thereof in any part which may be selected as desirable for knock out purposes. In the particular mold here used for illustration, the knock out pin is directed against the portion of the molded article which will subsequently be cut off in the finishing operations of the bottle, as described in detail in the co-pending application Serial No. 171,340.

Said knock out pin 100 extends through the back of the mold (Figures 4 and 7) and a knock out rod 101 is positioned to contact said pin.

A spring 102 is provided in a conventional manner to hold said pin in retracted position. The rod 101 is slidably mounted by brackets 103 and 106 located, respectively, on the movable mold mounting 56 and on the stationary mold mounting 51. A stop 104 is adjustably, as threadedly, positioned on the end of the knock out rod 101. As the mold mounting 56 for the movable mold 72 is moved away from the center of the machine in response to action of the mold opening cam track 82, the molds are thereby opened, the bracket 103 will engage the stop 104 and pull the pin engaging portion 105 of the knock out bar 101 against the knock out pin 100, thereby urging it into the mold cavity. This drives the molded article out of the mold where it can readily be grasped for removal by the operator. Adjustment of the stop 104 on the rod 101 will determine the amount of movement of the knock out pin.

*Operation*

The general operation and details of the method here employed are fully illustrated and claimed in the co-pending application of Elmer E. Mills Serial No. 171,340 and hence will be described in connection with the present machine only in enough detail to illustrate the operation of said machine. For further details of said method, reference is made to the disclosure of said co-pending application.

A conventional extruder 110 of convenient type, fitted with a cross head for extruding in a downward direction is positioned adjacent the machine above described, as best shown in Figures 1, 3 and 9. Said extruding head is so positioned with respect to the molds that said molds will pass on either side thereof and will commence closing immediately below the cross head whereby to grip the plastic material as closely as possible below its point of extrusion. Thus, as each successive arm 41 approaches the line A, its mold closing rollers 63 and 64 are guided by the mold closing cam surface 9 so as to move the movable mold half toward the stationary mold half and effect said gripping of the plastic tube. When said tube is gripped, the respective ends 110, 111, 112 and 113 (Figure 4) of the mold seal off a segment of said tube. Since the needle is fixed in the mold half 72 and extends into the cavity thereof, this closing of the mold on the tube causes said hollow needle 73 to enter into said segment.

When this position is attained for a given arm, said arm is approximately in the position of line E and the valve cam track 76 then acts upon the cam follower 75 to open the valve 74 for admitting pressure fluid through said hollow needle and to the interior of said isolated segment. The segment is thus blown into conformity with the walls of the mold. The pressure valve is held open and pressure is accordingly held on said plastic material until the arm in question reaches approximately the position of line F, at which point the valve cam track 76 permits the valve to terminate the supply of pressure fluid and opens a passageway from the needle to the atmosphere. The pressure fluid within the blown segment is now permitted to exhaust through said valve 74 to the atmosphere. At or below line C the pressure fluid is exhausted to atmospheric pressure and the action of the mold opening cam track 82 against the roller 69 of said arm causes the movable mold half to move radially outwardly and the mold is opened. The blown segment is now removed by hand and is subjected to whatever further finishing operations are desired, if any.

Accordingly, we have disclosed and described a machine capable of carrying out the above outlined objects.

While we have above described and illustrated a particular preferred embodiment of the invention, it should be understood that numerous variations may be made from the particular apparatus herein utilized for illustrative purposes and that said variations will all be cov-

We claim:

1. In a machine for making hollow articles from a continuously moving tube of softened synthetic organic plastic material, the combination including: a frame standing in a vertical plane and provided with an inner cam surface; a horizontally disposed shaft through said frame; means supporting said shaft rotatably on said frame; a plurality of radially extending arms supported on and rotatable with said shaft; a radially reciprocable and adjustably positioned mold half on each of said arms; a fixed mold half on each of said arms inwardly and adjustably positioned from said radially reciprocating mold halves and positioned to receive at a predetermined point a downwardly provided tube of softened plastic material; and a mold controlling cam follower on each of said radially reciprocable mold halves engaging the cam surface in said frame in a predetermined path as the said arms are rotated causing predetermined reciprocation of said mold halves toward and away from said fixed mold halves.

2. In a machine for making hollow articles from a continuously moving tube of softened synthetic organic plastic material, the combination including: a vertically positioned substantially rectangular frame; a cam surface in said frame; a shaft through said frame and provided radially with a stationary set of mold halves rotating with said shaft; means for rotatably supporting said shaft in said frame, radially positioned arms within the said frames and in registering position with said stationary mold halves and extending therefrom; a mold half radially reciprocable on said arms to register upon closure with a corresponding stationary mold half and moving in a predetermined manner as defined by said cam surface; a hollow needle in one of said mold halves extending into the mold cavity defined by said mold halves upon closure; a cam track coordinated with said cam surface; a valve admitting flow of pressure fluid to said mold cavity upon closure of said mold halves; and means continuously delivering a softened thermoplastic tube of material vertically downward into nesting position adjacent said stationary rotating mold halves.

References Cited in the file of this patent

UNITED STATES PATENTS

| 1,377,304 | Borchard | May 10, 1921 |
| 1,590,481 | Stenhouse et al. | June 29, 1926 |
| 1,646,412 | Lledo | Oct. 25, 1927 |
| 2,234,604 | Peck | Mar. 11, 1941 |
| 2,423,576 | Block | July 8, 1947 |
| 2,515,093 | Mills | July 11, 1950 |
| 2,579,390 | Mills | Dec. 18, 1951 |
| 2,579,399 | Ruekberg | Dec. 18, 1951 |
| 2,676,368 | Heiden et al. | Apr. 27, 1954 |